(12) United States Patent
Rudnick

(10) Patent No.: US 6,839,331 B2
(45) Date of Patent: Jan. 4, 2005

(54) METHOD TO DYNAMICALLY CHANGE ALL MIB PARAMETERS OF A WIRELESS DATA NETWORK

(75) Inventor: William Michael Rudnick, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 869 days.

(21) Appl. No.: 09/800,334

(22) Filed: Mar. 5, 2001

(65) Prior Publication Data

US 2002/0131371 A1 Sep. 19, 2002

Related U.S. Application Data

(60) Provisional application No. 60/245,546, filed on Nov. 2, 2000, and provisional application No. 60/245,646, filed on Nov. 2, 2000.

(51) Int. Cl.[7] .................................................. H04J 3/24
(52) U.S. Cl. ...................... 370/312; 320/329; 320/432; 320/457
(58) Field of Search ................................ 370/310, 312, 370/328, 329, 431, 432, 449, 457

(56) References Cited

U.S. PATENT DOCUMENTS

| 5,353,331 A | * | 10/1994 | Emery et al. ............... 455/461 |
| 5,787,080 A | * | 7/1998 | Hulyalkar et al. ....... 370/310.2 |
| 5,933,420 A | | 8/1999 | Jaszewski et al. |
| 5,958,018 A | * | 9/1999 | Eng et al. .................... 709/246 |
| 5,991,287 A | * | 11/1999 | Diepstraten et al. ........ 370/338 |
| 6,049,549 A | | 4/2000 | Ganz et al. |
| 6,092,117 A | | 7/2000 | Gladwin et al. |
| 6,160,804 A | * | 12/2000 | Ahmed et al. .............. 370/349 |
| 6,332,077 B1 | * | 12/2001 | Wu et al. ................. 455/432.1 |
| 6,345,043 B1 | * | 2/2002 | Hsu ............................ 370/324 |
| 6,393,482 B1 | * | 5/2002 | Rai et al. ..................... 709/225 |
| 6,473,413 B1 | * | 10/2002 | Chiou et al. ................ 370/331 |
| 6,512,756 B1 | * | 1/2003 | Mustajärvi et al. ......... 370/341 |
| 6,657,981 B1 | * | 12/2003 | Lee et al. .................... 370/331 |

OTHER PUBLICATIONS

ISO/IEC 8802:1999(E) IEEE Std 802.11, 1999 edition. International Standard Information Technology—Telecommunications and information exchange between systems–Local and metropolitan area networks—Specific Requirements—Part11: Wireless LAN Medium Access Control (MAC) and Physical Layer (PHY) specifications, §§ 9.3.4.1, 9.3.4.2, 1997.

* cited by examiner

Primary Examiner—Hassan Kizou
Assistant Examiner—Dmitry Levitan
(74) Attorney, Agent, or Firm—Robert D. Varitz, P.C.

(57) ABSTRACT

A method of changing parameters in an 802.11 WLAN includes determining a performance metric for the WLAN; monitoring the performance of the WLAN with a monitor management entity; generating a terminate and reconvene message when the performance of the WLAN drops below a performance metric threshold; selecting a reconvene BSS having a reconvene BSSID, changed 802.11 parameters and setting a time for the reconvene BSS to become operational; transmitting the terminate and reconvene message to all STAs in the BSS; and instantiating the reconvene BSS at the set time.

16 Claims, 1 Drawing Sheet

METHOD TO DYNAMICALLY CHANGE ALL MIB PARAMETERS OF A WIRELESS DATA NETWORK

RELATED APPLICATIONS

This application is related to U.S. Provisional Patent Application Ser. No. 60/245,546, filed Nov. 2, 2000, for Method to dynamically adapt both modifiable and non-modifiable parameters of a wireless data network; and to U.S. Provisional Patent Application Ser. No. 60/245,646, filed Nov. 2, 2000, for Automated method to dynamically change channels in a wireless data network, and claims priority from both identified Provisional Patent Applications. This application is also related to U.S. patent application Ser. No. 09/795,539 filed Feb. 28, 2001, for Quality of Service using Wireless LAN.

FIELD OF THE INVENTION

This invention relates to IEEE 802.11 wireless LAN parameters and optimization thereof, and to a method of dynamic channel changing within the 802.11 standard.

BACKGROUND OF THE INVENTION

The IEEE's standard for wireless LANs, designated IEEE 802.11, provides two different ways to configure a network: ad-hoc and infrastructure. In an ad-hoc network, nodes form a network "on the fly," with each 802.11 device joining the network as it is able to send and receive signals. There is no defined structure in an ad-hoc network; there are no fixed points; and every node in the network is ideally able to communicate with every other node in the network. Although it may seem that order would be difficult to maintain in this type of network, sufficient algorithms, such as the spokesman election algorithm (SEA), are provided and are designed to "elect" one machine as the base, or master, station of the network, with the others machines being "slaves." Another algorithm in ad-hoc network architectures uses a broadcast and flooding method to all other nodes to establish the identity of all nodes in the network.

The infrastructure architecture provides fixed network access points for communications, possibly with mobile nodes. These network access points (APs) are sometime connected to land lines to widen the LAN's capability by bridging wireless nodes to other wired nodes. If service areas overlap, handoffs may occur between wireless LANs. This structure is very similar to that used in cellular networks, however, cellular protocols are not part of the 802.11 standard.

IEEE 802.11 standard places specifications on the parameters of both the physical (PHY) and medium access control (MAC) layers of the network. The PHY layer, which actually handles the transmission of data between nodes, may use either direct sequence spread spectrum, frequency-hopping spread spectrum, or infrared (IR) pulse position modulation. IEEE 802.11 makes provisions for data rates of either 1 Mbps or 2 Mbps, and requires operation in the 2.4–2.4835 GHz frequency band, in the case of spread-spectrum transmission, which is an unlicensed band for industrial, scientific, and medical (ISM) applications; and in the 300–428,000 GHz frequency band for IR transmission. Infrared is generally considered to be more secure to eavesdropping, because IR transmissions require absolute line-of-sight links, i.e., no transmission is possible outside any simply connected space or around corners, as opposed to radio frequency transmissions, which can penetrate walls and be intercepted by third parties. However, infrared transmissions may be adversely affected by sunlight, and the spread-spectrum protocol of 802.11 does provide some rudimentary security for typical data transfers.

The MAC layer includes a set of protocols which is responsible for maintaining order in the use of a shared medium. The 802.11 standard specifies a carrier sense multiple access with collision avoidance (CSMA/CA) protocol. In this protocol, when a node receives a packet to be transmitted, it first listens to ensure no other node is transmitting. If the channel is clear, it then transmits the packet. Otherwise, it chooses a random "backoff factor," which determines the amount of time the node must wait until it is allowed to transmit its packet. During periods in which the channel is clear, following a short waiting period, the transmitting node decrements its backoff counter. When the channel is busy it does not decrement its backoff counter. When the backoff counter reaches zero, the node transmits the packet. Because the probability that two nodes will choose the same backoff factor is small, collisions between packets are minimized. Collision detection, as is employed in Ethernet®, cannot be used for the radio frequency transmissions of IEEE 802.11, because when a node is transmitting, it cannot hear any other node in the system which may be transmitting, because its own signal will block any other signals arriving at the node. Whenever a packet is to be transmitted, the transmitting node may first send out a short ready-to-send (RTS) packet containing information on the length of the packet. If the receiving node hears the RTS, it responds with a short clear-to-send (CTS) packet. After this exchange, the transmitting node sends its packet. When the packet is received successfully, as determined by a cyclic redundancy check (CRC), the receiving node transmits an acknowledgment (ACK) packet. This back-and-forth exchange is used to avoid the "hidden node" problem, i.e., node A can communicate with node B, and node B can communicate with node C. However, node A cannot communicate node C. Thus, for instance, although node A may sense the channel to be clear, node C may in fact be transmitting to node B. The protocol described above alerts node A that node B is busy, and requires node a to wait before transmitting its packet.

Although 802.11 provides a reliable means of wireless data transfer, some improvements to it have been proposed. The use of wireless LANs is expected to increase dramatically in the future as businesses discover the enhanced productivity and the increased mobility that wireless communications can provide and as unit prices come down.

802.11 wireless LANs contain both fixed and variable parameters. The fixed parameters can not be changed for the life of the LAN instantiation. This means if conditions change e.g., traffic load, extraneous RF interference, etc., the original selection of values for the fixed parameters may become sub-optimal. Neither the 802.11 standard nor the known prior art address changing fixed 802.11 parameters during the life of a BSS.

802.11 channel RF noise can come from many sources, including overlapping BSSs and other RF radiators such as microwave ovens, lightning, etc. Depending upon the PHY in use, one channel may be noisy while another my be relatively noise-free. When a channel used by an 802.11 WLAN under the as-published 802.11 standard is noisy, many packet errors occur.

U.S. Pat. No. 5,933,420, granted Aug. 3, 1999 to Jaszewski et al., for Method and apparatus for assigning spectrum of a wireless local area network, describes use of mutually non-interfering frequencies and/or channels by overlapping BSSs depending on RF signal strength and other indicators. The reference describes use of minimally-interfering channels rather than changing frequencies and/or channels.

U.S. Pat. No. 6,049,549, granted Apr. 11, 2000 to Ganz et al., for Adaptive media control, describes a variant of the 802.11e standard wherein streams which have a history of using less of their allocated resources are polled less frequently.

U.S. Pat. No. 6,092,117, granted Jul. 18, 2000 to Gladwin et al., for System and method for automatically reconnecting a wireless interface device to a host computer, describes a technique for automatically reconnecting to a previously selected wireless host upon power up.

There are two primary solutions for 802.11 packet errors in the prior art. The first is to terminate the current BSS, reconfigure it to use another, hopefully better channel, and then create a new BSS using the newly selected channel. This procedure require manual intervention by a system administrator. The second uses an automated mechanism to monitor all channels and then change the channel used in a BSS in a coordinated fashion if channel performance degrades and a sufficiently better channel is available. Gerard Cervello, Sunghyun Choi, Stefan Mangold, and Amjad Soomro; Dynamic Channel Selection (DCS) Scheme for 802.11; Jul. 12, 2000; IEEE 802.11-00/195r2, uses a channel-switch announcement in step six of a seven-step process to change channels/frequencies across an entire BSS. This approach is different from that of the first-mentioned prior art solution in that it does not terminate the existing BSS, nor does it create a new BSS; it simply changes the channel used by a single BSS in a coordinated fashion. No fixed parameters are modified.

SUMMARY OF THE INVENTION

A method of changing parameters in an 802.11 WLAN includes determining a performance metric for the WLAN; monitoring the performance of the WLAN with a monitor management entity; generating a terminate and reconvene message when the performance of the WLAN drops below the performance metric; selecting a reconvene BSS having a reconvene BSSID, new 802.11 parameters and setting a time for the reconvene BSS to become operational; transmitting the terminate and reconvene message to all STAs in the BSS; and instantiating the reconvene BSS.

An object of the invention is to provide variable parameters in the 802.11 wireless LAN standard.

A further object of the invention is to optimize the performance of the 802.11 wireless LAN.

Another object of the invention is to provide a terminate and reconvene mechanism for use in a WLAN.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

Figure 1:
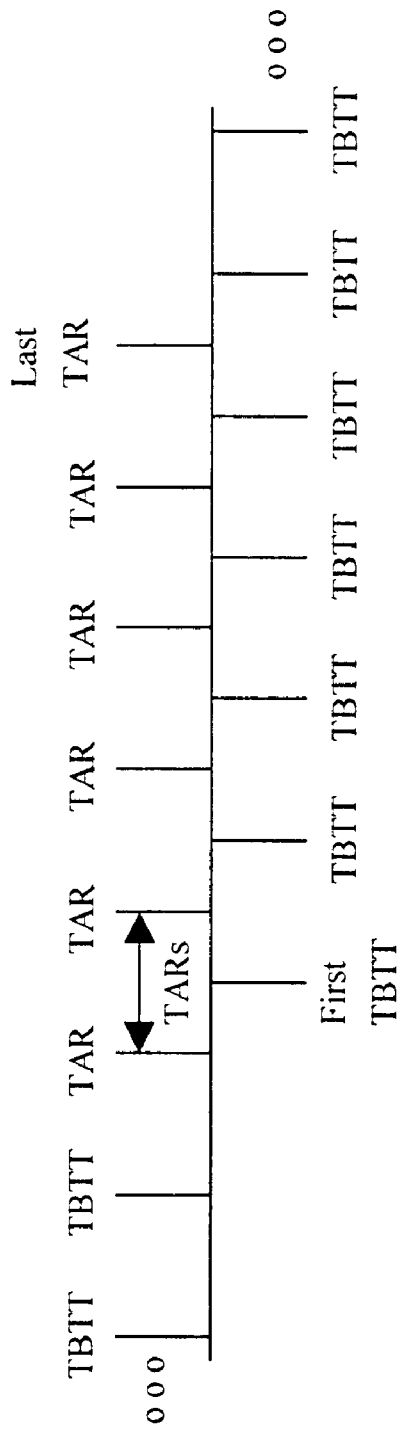
FIG. 1 depicts the 802.11 standard BSS timeline and a reconvene BSS timeline of the invention.

This invention allows the fixed management information base (MIB) parameters in the IEEE 802.11 standard to be changed, and therefore optimized and/or adapted as conditions change. A method to change 802.11 wireless LAN (WLAN) fixed parameters is described. A wireless LAN is instantiated through the basic service set (BSS). The BSS is the WLAN analogue of a wired local area network. An infrastructure BSS, usually referred to simply as a BSS, has an access point (AP) that serves as a central coordinator for the BSS. An independent basic service set (IBSS) has no AP, no central coordinator—the AP tasks are shared among the stations (STAs) comprising the IBSS. A BSS is identified by its BSS IDentification value (BSSID).

Throughout this description, BSS is understood to mean either infrastructure BSS or IBSS, unless otherwise noted. Further, all references to clauses, annexes and 802.11 are understood to refer to the ISO/IEC 8802-11 (ANSI/IEEE Std 802.11) 1999 document "Information technology—Telecommunications and information exchange between system—Local and metropolitan area networks—Specific requirements—Part 11: Wireless LAN Medium Access Control (MAC) and Physical (PHY) specifications." Acronyms used are either drawn from the 802.11 specification or defined herein.

Timing is coordinated across the BSS by broadcasting a Beacon frame at a specified time interval. The time at which the Beacon should be sent is called the Target Beacon Transmit Time (TBTT). Selected Beacons include a Delivery Traffic Indication Message (DTIM) field which is used to indicate pending traffic on a station-specific basis. In an infrastructure BSS, stations in power-save mode are required to wake up to receive DTIM Beacons, so baring RF noise or similar problems, every STA should receive a DTIM Beacon.

In an IBSS, an Ad hoc Traffic/Indication Message (ATIM), also known as an Announcement TIM, is sent instead of a DTIM to indicate pending traffic for a power-save STA, The ATIM is sent during the ATIM window, which occurs immediately following Beacon transmission.

802.11 Fixed Parameters

The 802.11 standard specifies three parameters that can only be set at BSS startup time. These parameters must remain unchanged for the life of the BSS. The parameters are (1) ATIM window, (2) dot11CFPPeriod, and (3) dot11CFPMaxDuration. The fixed-for-lifetime-of-BSS nature of these parameters creates a problem because settings that are appropriate at one time may become inappropriate at other times. For example, the size of the ATIM Window is, among other parameters, important in determining how well an IBSS performs. But optimal IBSS performance with one value for the ATIM window may degrade due to changes in traffic load and/or the number of STAs in the IBSS. The situation is similar for the other two fixed parameters. In addition, the way in which the BSS is being used may change. For example, a BSS may be used primarily for block data transfer most of the time, but occasionally be used for real-time video or audio transfer.

Changing of Fixed Parameters—the TAR Technique

The method of the invention includes the use of an automated mechanism to terminate the existing BSS and create a new BSS with new parameters, and therefore different performance, optimized for the new traffic/load/usage conditions. In effect, the method of the invention terminates the original BSS and reconvenes in a newly created BSS, the reconvene BSS. This terminate and reconvene mechanism is referred to herein as TAR.

The terminate and reconvene mechanism works as follows: An entity called the monitor management entity (MME) functions as an Simple Network Management Protocol (SNMP) manager and monitors the performance of the 802.11 WLAN using an implementation-specific metrics. The exact metrics or performance criteria used will be apparent to those of ordinary skill in the art.

ATIM Window Size Adjustment

Referring now to FIG. 1, comparative timelines for the original BSS and the reconvene BSS of the invention are depicted. The ATIM window is used in the IBSS exclusively for synchronizing transmission of both directed and multicast MPDUs to power-save STAs. It occurs at the beginning of each Beacon Interval directly following the Beacon in an IBSS. A STA having, e.g., a directed MPDU for the power-save STA, transmits an ATIM during the ATIM window to announce the pending MPDU to the power-save STA. The power-save STA will wake up during each ATIM window to listen for an ATIM indicating traffic for them. If an ATIM indicating pending directed MPDUs for the power-save STA is received, the power-save STA will acknowledge the ATIM and stay awake through the end of the following ATIM window in order to receive the pending MPDU.

All STAs use the DCF backoff procedure to send their first ATIM during an ATIM window. Additional ATIMs may be transmitted during an ATIM window by following DCF channel access rules. Following the ATIM window, MPDUs may be sent, by use of DCF channel access rules, to power-save STAs that acknowledged an ATIM during the ATIM window.

It is desirable to have the ATIM window be only large enough to allow announcement of all pending traffic to power-save STAs, so that the remainder of the Beacon Interval will be as large as possible so that as many MPDUs may be sent to the now-awake power-save STAs as possible. An excessively large ATIM window results in wasted or unused channel time. Determining how large an ATIM window is needed depends upon the number of power-save STAs in the IBSS, how many STAs have traffic for the power-save STAs, and how much traffic the STAs have for the power-save STAs. An IBSS with only one power-save STA that only occasionally receives traffic needs a much smaller ATIM window than an IBSS with 40 power-save STAs which each regularly receiving traffic. Because an IBSS is by definition an ad hoc WLAN, the number of power-save STAs in the IBSS may well change dramatically over time.

Because the ATIM window size is fixed for the lifetime of an IBSS, the only practical solution, without using the TAR of the invention, was to set the ATIM window size to the maximum size expected to be needed during the entire life of the IBSS. This likely meant that most of the ATIM window was wasted channel time during most of the life of the IBSS. Use of the TAR allows the ATIM window size to be changed from time to time as use of the ATIM window increases and decreases, thereby making more effective use of the available WLAN channel.

When WLAN performance falls below a designated level, the MME causes a sequence of TAR messages, to be broadcast to the BSS starting at the next DTIM TBTT in place of the Beacon. Before the first TAR is broadcast, the MME, typically the restart station, selects a new, reconvene BSSID for the reconvene BSS and new values to which the 802.11 parameters will be changed.

In the related patent application for Quality of Service using Wireless LAN, a technique which requires changing the duration and frequency of the Contention Free Period (CFP) is disclosed. Changing the duration and frequency of the CFP, however, depends in part upon changing the 802.11 MIB parameters dot11CFPPeriod and dot11CFPMaxDuration. However 802.11 specifies that MIB parameters dot11CFPPeriod and dot11CFPMaxDuration must remain fixed for the life of the BSS. TAR provides an automated method to change dot11CFPPeriod and dot11CFPMaxDuration.

The TARs are broadcast by the STA that would have otherwise broadcast the Beacon, the AP in an infrastructure BSS. This STA is called the "restart STA". The TAR is broadcast by the restart STA at the DTIM TBTT so that as many STAs as possible will receive it. Because STAs in the power save (PS) doze state may wake up for the DTIM, they may receive the TAR.

The number of TARs broadcast is implementation dependent. The first TAR is broadcast following the same rules as are used to broadcast the Beacon. Specifically, the first TAR may be delayed due to a channel-busy condition, just as the Beacon may be delayed. After the first TAR has been broadcast, succeeding TARs may be broadcast by the restart STA after a short intraframe space (SIFS) period from the end of the previous TAR for at least one Beacon cycle, fully occupying the channel. Following this, TARs are broadcast at each TBTT for a period of time.

Note that all TARs are identical and are broadcast to all STAs at once. Thus, it is possible that all STAs could receive the first TAR broadcast. However, multiple TARs should be sent. First, not all STAs may receive the first TAR broadcast due to RF channel noise. Second, extreme low power STAs may not wake up for every Beacon, or even for every DTIM or Beacon/ATIM-window. So TARs should continue to be broadcast to the old BSS TBTT through several DTIM cycles.

Each TAR frame contains information identifying the reconvene BSS, including the parameters needed for inclusion in the MAC Sublayer Management Entity (MLME)-SCAN.request function primitive and the new BSSID for the reconvene BSS. The TAR also specifies at what time the switch to the reconvene BSS will occur. Finally, the TAR may specify a passive scan, as opposed to an active probe, of the reconvene BSS so as to minimize channel contention. The TAR frame shall be either a management frame or a control frame, and will use one of the unused/reserved subtype values.

Upon reception of the TAR, each STA silently disassociates itself from the BSS, i.e., doesn't send a disassociation frame. Alternately, each STA may disassociate in the normally 802.11 fashion by sending a disassociate frame. In the latter case, the restart STA must not fully occupy the channel with TAR transmissions, e.g., wait an extended inter-frame space (EIFS) between each TAR transmission and should acknowledge any disassociate frames received.

Next, the restart STA uses the modified fixed parameters, and potentially, other modified parameters as well, and the previously-selected new BSSID to create the reconvene BSS in the usual 802.11 fashion, by sending a Beacon frame describing the reconvene BSS.

Once the reconvene BSS has been detected by receiving a reconvene BSS Beacon, each STA, other than the restart STA, which is already a member of the reconvene BSS because it started the reconvene BSS, performs a random back off. After completing its back off each STA shall authenticate and re-associate with the reconvene BSS.

After broadcasting the last TAR to the old BSS, the restart STA may send a dissociation message containing the broadcast address. This is a catch-all, causing STAs that missed the TARs but received the dissociation message, or do not support the TAR mechanism, to dissociate and thus not waste time unnecessarily in a nonexistent BSS.

As an optimization, the restart STA should schedule the reconvene BSS's TBTT to occur as far in time as possible from the old BSS's TBTT so that the additional TARs sent at the old BSS's TBTT minimally interfere with operation of the reconvene BSS.

Another optimization is to do away with STA authentication/association in the reconvene BSS during the terminate and reconvene process. For an infrastructure BSS, the restart STA, i.e., the AP, simply maintains the record of all member STA's of the original BSS, including their AIDs and capability information, and carries them over as members of the reconvene BSS. The reconvene BSS begins life with each such STA already associated and authenticated. Similarly, each non-AP STA keeps its existing original BSS AID, and similarly, other relevant information, changing only the BSSID, as its reconvene BSS AID and perform neither authentication nor association with the reconvene BSS. In effect, each STA is already a member of the reconvene BSS.

This method may be used to change not only fixed parameters, but to change any 802.11 parameter. Thus, the TAR approach offers a convenient way to perform network management functions. This is especially true for difficult to change parameters, such as dot11BeaconPeriod, dot11DTIMPeriod, or PHY parameters. These parameters may all be easily changed using the TAR technique.

Channel Changing

The channel changing method of the invention uses the TAR mechanism to terminate the current BSS and create a new BSS. This channel changing techniques differs from prior art in two respects: First, and most important, the method of the invention does not maintain the original BSS. Instead, the method of the invention uses the TAR technique in which the original BSS is terminated and replaced by an entirely new BSS operating, in this case, on a different channel, thereby effecting a channel change in an automated fashion. Currently, using the IEEE 802.11 standard, the channel is changed by manually terminating the original BSS, and then manually creating a new BSS using the new channel. Use of the TAR method automates what was previously a manual process. This is significant because if 100 STAs are in the wireless LAN, considerable manual work is required to change the channel and the BSS for each of the 100 STAs.

Second, alternate channels are not monitored, and the method of the invention does not make channel comparisons or judgements about relative channel performance, although doing so is not precluded. The method of the invention allows a network administrator to manually instigate a channel change across all STAs in the BSS in an automated fashion. This contrasts to the prior art approach of Cervello et al., in which all channels, including the current channel, are periodically monitored, their "goodness" evaluated, and a judgement made repeatedly about whether or not to switch channels. Thus, the new approach is simpler and cheaper to implement. For example, only a single RF unit is needed, and that RF unit is solely for use on the current channel.

Automated Channel Changing 802.11 channel RF noise and reception problems originate from many sources, including overlapping BSS's, other RF radiators such as microwave ovens, lightning, and the RF null landscape. Depending upon the PHY in use, one channel may be noisy while another may be relatively noise-free. When the channel used by an 802.11 WLAN is noisy, many packet errors may occur.

The existing practice is to terminate the current BSS, reconfigure it to use another, hopefully better channel, and then create a new BSS using the newly selected channel, which is all done manually. This may be satisfactory for a static configuration run under static conditions, however, under dynamic conditions, an automated means of channel changing is needed.

Dynamic Channel Changing

Dynamic channel changing may be accomplished using the TAR technique, but, instead of changing fixed BSS parameters, the PHY parameters are changed. The TAR technique terminates the existing BSS, changes selected parameters/assignments, and then creates a new BSS having the new parameters/assignments, referred to herein as the reconvene BSS.

The TAR method is well suited for changing Direct Sequence Spread Spectrum (DSSS) PHY parameters, such as channel number, to accomplish automated channel switching. An entirely new BSS is created in which STAs have many opportunities to receive the TAR change-channel message. Likewise, the TAR technique may be used to change frequency hopping PHY parameters, such as dwell time, hop set, hop pattern, and hop index. The ability to change channels in an automated fashion is useful to move from a poor channel i.e., one with interference from extraneous RF noise and or other BSSs operating nearby, to another channel, hopefully one with less RF noise.

As previously noted, the MME monitors the performance of the 802.11 WLAN using implementation-specific metrics. When WLAN performance falls below a designated level, the MME invokes the TAR mechanism to disband the current BSS and create a reconvene BSS using the new channel.

Though the details of what channel is changed to are implementation dependent and beyond the scope of this invention, a simple approach could be implemented as follows: Order all available channels into a list. When the network administrator asks for the channel to be changed, simply advance to the next channel in the list, with wrap-around. Over a sequence of channel changes, all channels will be tried in turn. Alternately, when the network administrator requests a channel change she could be given a list of channels to choose from as a pop-up menu.

A TAR Variation

An variation of the TAR technique may be used and is particularly useful when the channel is being switched. Instead of waiting to start the reconvene BSS until after terminating the original BSS, the reconvene BSS is created before the original BSS is terminated by setting the instant time for the RBSS to become operational. With this improvement, STAs receiving the TAR frame immediately disassociate and then immediately authenticate/associate with the reconvene BSS. A repeating sequence of TARs followed by a broadcast disassociation may be broadcast to the original BSS for an extended period of time. This improvement works well because the reconvene BSS and original BSS use different channels and therefore minimally interference with each other's operation. This has the advantage that, because of the overlapping existence of the two BSSs, STAs in the original BSS who missed the first sequence of TARs will eventually receive a TAR frame and move over to the reconvene BSS, thereby minimizing the number of lost stations.

This variation may also be used when the current channel is not being switched. In this case, the restart STA will switch between two different BSSs, the original and the reconvene BSS, which share the same channel. Because the two BSSs are sharing the same channel they each will view the other's traffic as from an overlapping BSS and therefore, as interference, because channel acquisition rules will be used in both BSSs. However, because the WLAN is designed to work in the presence of a certain amount of interference, this will not be a problem.

In all cases the reconvene BSS's TBTT should be positioned in time as far as possible from the original BSS's TBTT. This is because the AP, or in an IBSS, the current Beacon STA, must broadcast both the TAR frame to the original BSS at the original BSS's TBTT, and the Beacon frame to the reconvene BSS at the reconvene BSS's TBTT.

Finally, when STAs join the reconvene BSS, the AP acquires, in effect, a roll-call of which STAs have made the transition from the original BSS to reconvene BSS. This roll call information may be used in two ways. First, if any STA failed to make the switch when the AP stops sending TARs, the AP may provide a notification of that fact to the network manager so that remedial action may be taken. Second, once all STAs from the original BSS have switched, the AP knows there are no STAs remaining in the original BSS. Therefore, it may immediately stop sending TARs to the original BSS because there is no longer any STA to hear them.

The method disclosed herein differs in from the known prior art in three major aspects: First, available channels are not monitored for QoS. Thus, the method of the invention is much simpler. Second, the original BSS is not maintained. Instead, the method of the invention uses the TAR technique, in which the original BSS is terminated and an entirely new BSS is created. Thirdly, the TAR techniques modifies fixed parameters, unlike the prior art methods.

Thus, a method of terminating and reconvening a BSS has been disclosed. It will be appreciated that further variations and modifications thereof may be made within the scope of the invention as defined in the appended claims.

I claim:

1. A method of changing 802.11 paramenters in an 802.11 WLAN having plural STAs therein, connected through a BSS operating on a current channel, comprising:

determining a performance metric for the 802.11 WLAN;

monitoring the performance of the 802.11 WLAN with a monitor management entity;

generating a terminate and reconvene message when the performance of the WLAN drops below a performance metric threshold;

selecting a reconvene BSS having a reconvene BSSID, changed 802.11 parameters and setting a time for the reconvene BSS to become operational;

transmitting the terminate and reconvene message to all STAs in the BSS; and instantiating the reconvene BSS at the set time.

2. The method of claim 1 wherein said instantiating includes each STA silently dissociating itself from the BSS and joining the reconvene BSS.

3. The method of claim 1 wherein said instantiating includes each STA sending a dissociating frame to the BSS to dissociate itself from the BSS and joining the reconvene BSS.

4. The method of claim 1 wherein said monitoring includes designation of a STA as a restart STA and wherein said generating includes generating a terminate and reconvene message by the restart STA.

5. The method of claim 1 wherein said generating a terminate and reconvene message includes transmitting plural terminate and reconvene frames.

6. The method of claim 1 wherein said selecting includes designating a channel other than the current channel for use by the reconvene BSS.

7. The method of claim 1 wherein said selecting includes changing physical layer parameters.

8. The method of claim 1 wherein said selecting includes setting the instant time for the reconvene BSS to become operational.

9. A method of changing 802.11 paramenters in an 802.11 WLAN having plural STAs therein, connected through a BSS operating on a current channel, wherein a beacon frame is broadcast on the WLAN at a target beacon transmit time, and wherein selected beacon frames include a delivery traffic indication message, comprising:

determining a performance metric for the 802.11 WLAN;

monitoring the performance of the 802.11 WLAN with a monitor management entity;

generating a terminate and reconvene message when the performance of the WLAN drops below a performance metric threshold;

selecting a reconvene BSS having a reconvene BSSID, changed 802.11 parameters and setting a time for the reconvene BSS to become operational;

transmitting the terminate and reconvene message in place of the beacon frame to all STAs in the BSS; and instantiating the reconvene BSS at the set time.

10. The method of claim 9 wherein said instantiating includes each STA silently dissociating itself from the BSS and joining the reconvene BSS.

11. The method of claim 9 wherein said instantiating includes each STA sending a dissociating frame to the BSS to dissociate itself from the BSS and joining the reconvene BSS.

12. The method of claim 9 wherein said monitoring includes designation a STA as a restart STA and wherein said generating includes generating a terminate and reconvene message by the restart STA until all STAs in the BSS have received the terminate and reconvene message.

13. The method of claim 9 wherein said generating a terminate and reconvene message includes transmitting plural terminate and reconvene frames.

14. The method of claim 9 wherein said selecting includes designating a channel other than the current channel for use by the reconvene BSS.

15. The method of claim 9 wherein said selecting includes changing physical layer parameters.

16. The method of claim 9 wherein said selecting includes setting the instant time for the reconvene BSS to become operational.

* * * * *